United States Patent [19]

Urayama

[11] 4,005,271
[45] Jan. 25, 1977

[54] AUTOMATIC TELEPHONE ANSWERING AND RECORDING APPARATUS

[75] Inventor: Yuji Urayama, Yokohama, Japan
[73] Assignee: Victor Company of Japan, Limited, Yokohama, Japan
[22] Filed: May 5, 1975
[21] Appl. No.: 574,411

Related U.S. Application Data

[63] Continuation of Ser. No. 389,596, Aug. 20, 1973, abandoned.

[30] Foreign Application Priority Data

| Aug. 23, 1972 | Japan | 47-83705 |
| Aug. 26, 1972 | Japan | 47-84984 |
| Sept. 8, 1972 | Japan | 47-89544 |

[52] U.S. Cl. .............................. 179/6 R; 179/6 E
[51] Int. Cl.² .................................. H04M 1/64
[58] Field of Search ............... 179/6 E, 6 R, 6 AC

[56] References Cited

UNITED STATES PATENTS

| 2,946,852 | 7/1960 | Brown | 179/6 R |
| 3,293,365 | 12/1966 | Mitsui | 179/6 E |
| 3,337,690 | 8/1967 | Martin | 179/6 E |
| 3,508,004 | 4/1970 | Waldman | 179/6 E |
| 3,721,765 | 3/1973 | Ho | 179/6 R |
| 3,723,656 | 3/1973 | Curtis | 179/6 E |
| 3,728,488 | 4/1973 | Bonsky | 179/6 R |
| 3,728,489 | 4/1973 | Beacham | 179/6 R |
| 3,757,049 | 9/1973 | Bonsky | 179/6 E |

Primary Examiner—Raymond F. Cardillo, Jr.
Assistant Examiner—Alan Faber
Attorney, Agent, or Firm—Owen, Wickersham & Erickson

[57] ABSTRACT

An automatic telephone answering and recording apparatus comprises: Answering means operating automatically in response to a telephone call signal arriving over a telephone line when the called person is absent to close the talking circuit of the telephone set, to reproduce an answering message previously recorded on a first cassette tape, and to send this message toward the caller over the telephone line; message recording means for recording on a second cassette tape an incoming message sent from the calling person over the telephone line; detecting means for detecting the fact that the second cassette tape has been paid out to its extreme end portion; and control means operating when there is no output of the detecting means to carry out normal telephone line connection and driving of the first cassette tape and operating when there is an output of the detecting means to carry out telephone line connection with a delay and, at the same time, not to carry out signal reproduction and transmission from the first cassette tape.

4 Claims, 7 Drawing Figures

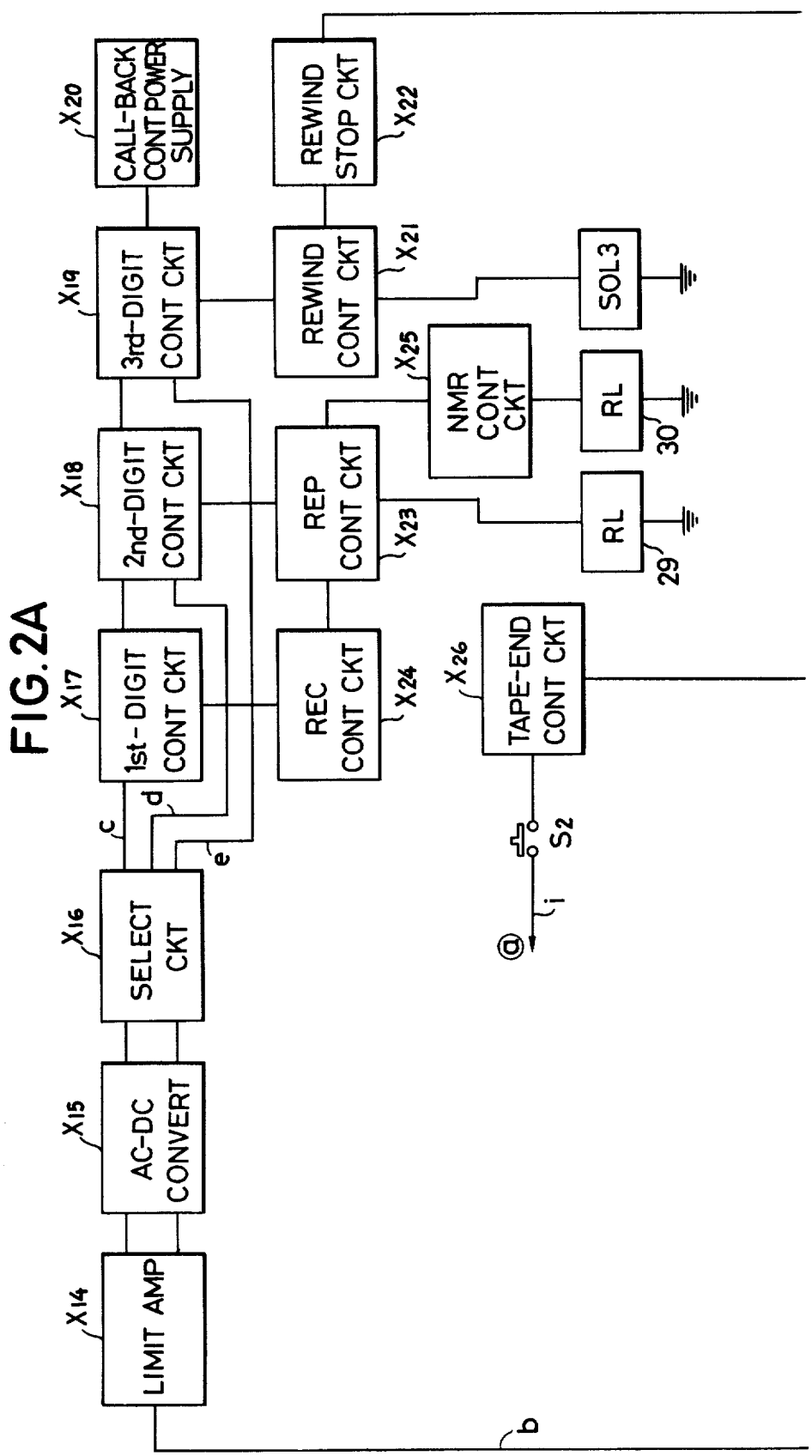

4,005,271

AUTOMATIC TELEPHONE ANSWERING AND RECORDING APPARATUS

This is a continuation, of application Ser. No. 389,596 filed Aug. 20, 1973 now abandoned.

BACKGROUND OF THE INVENTION

The present invention relates generally to an automatic telephone answering and recording apparatus capable of being remotely controlled. More particularly, the invention relates to an apparatus of the type stated above carrying out different operations depending on whether or not a still recordable portion is remaining in a tape for recording an incoming message and so adapted that, particularly in the case where the tape has been paid out to its extreme end, the apparatus and a telephone line are connected, and transmission of an answering message to the calling person or the caller is not carried out.

In an automatic telephone answering and recording apparatus in general use at present, when the tape for recording incoming messages reaches its end during recording of an incoming message, the connection between the apparatus and the telephone line is cut and thereafter this state is sustained. However, in an automatic telephone answering and recording apparatus of a remote-control type, it is required that the apparatus and the telephone line be held in the connected state and that the apparatus be remotely controllable even when the tape for incoming message recording reaches its end.

SUMMARY OF THE INVENTION

It is a general object of the invention to provide a novel and useful automatic telephone answering and recording apparatus of remotely controllable type which satisfies the above stated requirements.

A specific object of the invention is to provide an automatic telephone answering and recording apparatus which operates in response to a call signal arriving over a telephone line to carry out different operations respectively for the case where a recordable portion is remaining in a tape for recording incoming messages and for the case where this tape has been paid out to its extreme end.

Another object of the invention is to provide an apparatus of the above stated character in which, in the case where the cassette tape on the incoming message recording side is in a state wherein it has already been paid out to its extreme end at the time of arrival of a call signal from a caller, an answering message previously recorded is not sent to the caller, or the answering time is set longer than that under normal conditions thereby to prevent any sending of an incoming message to the caller.

Still another object of the invention is to provide an apparatus of the above stated character in which, when the cassette tape on the incoming message recording side is paid out to its extreme end during recording of an incoming message, the connection between the apparatus and the telephone line is not cut, but a warning sound is sent to the caller, and, at the same time, the means for driving the above mentioned cassette is rendered inoperative.

A further object of the invention is to provide an apparatus as stated above in which means are provided whereby the owner of the apparatus can control from a remote point the apparatus in a state wherein the cassette tape on the incoming message recording side has been paid out to its extreme end.

Other objects and further features of the invention will be apparent from the following detailed description when read in conjunction with the accompanying drawings.

BRIEF DESCRIPTION OF THE DRAWINGS

In the drawings:

FIGS. 2A and 2B are block diagrams showing the circuit organization of the first embodiment of the apparatus shown in FIG. 1;

DETAILED DESCRIPTION

Figure 1:
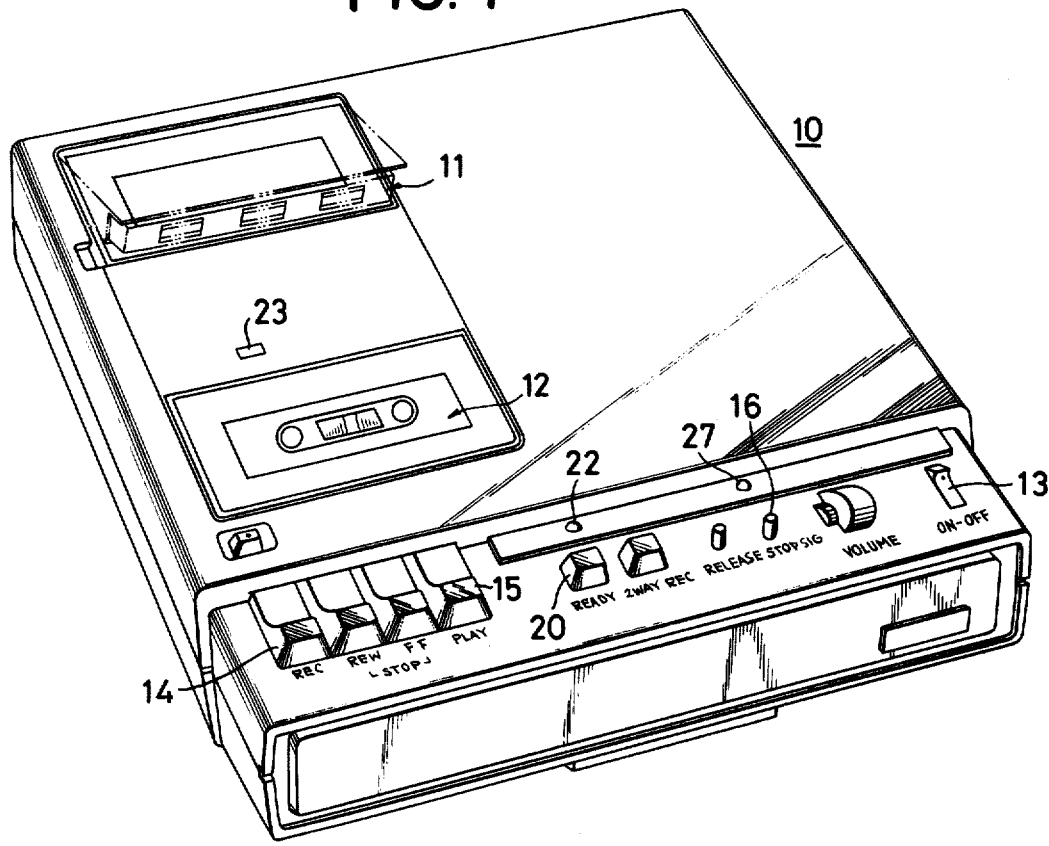
FIG. 1 is a perspective view showing the exterior of the top, front, and left side of one example of an automatic telephone answering and recording apparatus according to the invention.
Figure 2B:
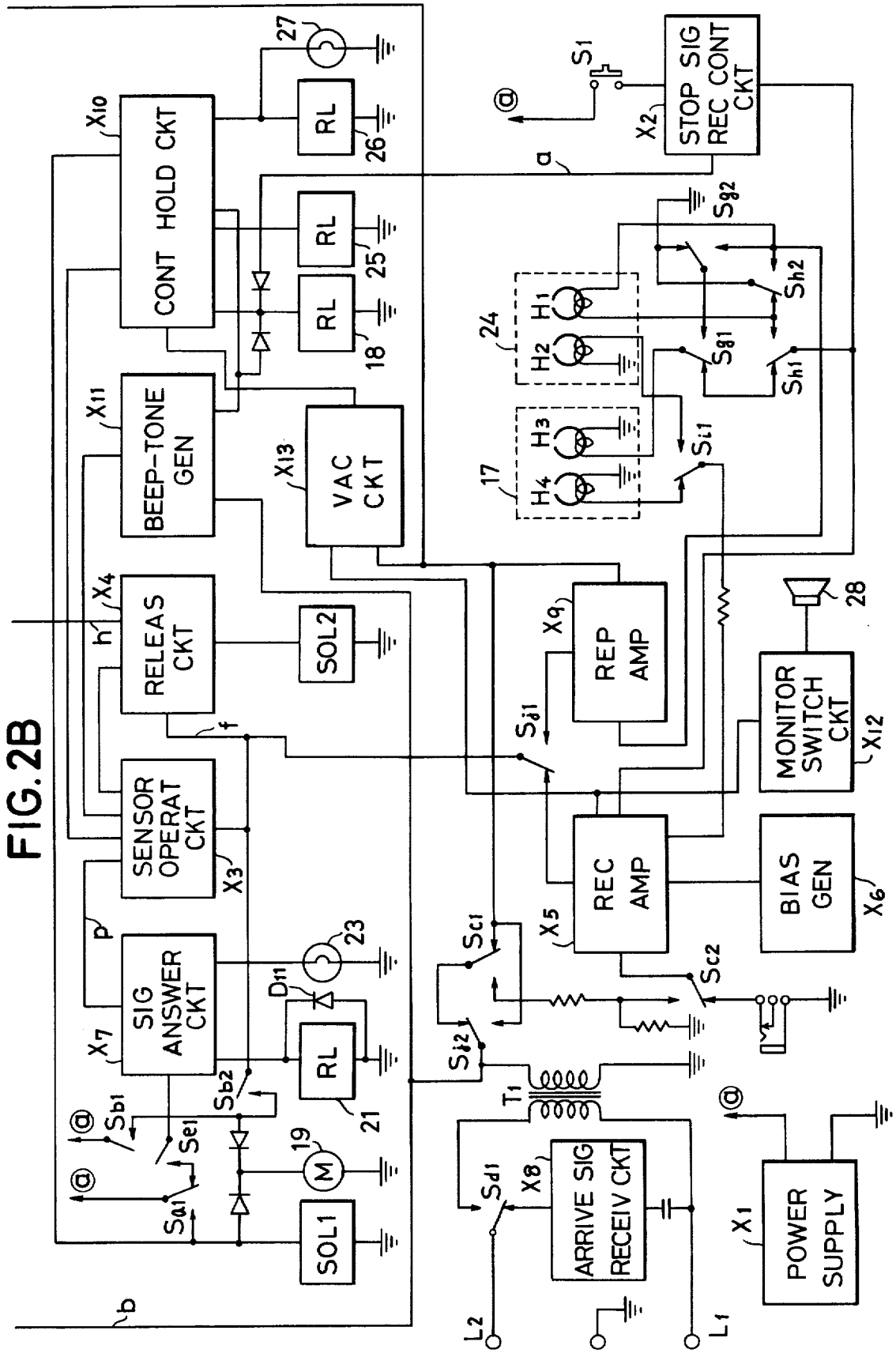

First, the operation of an automatic telephone recording and answering apparatus 10 in which a device for preventing an operation uncapable of recording, constituting an essential part of the device of this invention, will be described in outline form in conjunction with FIGS. 1, 2A and 2B. In the automatic telephone recording and answering apparatus 10 (hereinafter referred to simply as apparatus), an endless-tape cassette 11, on which a required outgoing message has previously been recorded and a still unrecorded cassette 12 having finite ends for recording incoming messages are inserted in respective loading positions.

When a power supply switch 13 is switched on, a power supply circuit X1 is activated, and a DC voltage is supplied to the circuits described hereinafter. Then, a recording button 14 and a playing (reproducing) button 15 are pushed down, and a stop signal recording button 16 is further depressed, whereupon a switch S1 is closed, and a stop signal recording controlling circuit X2 operates for a predetermined time. An oscillation output from the circuit X2 passes through relay contact points Sh1 and Sg1 and is supplied to a playing head H3 for incoming messages of a head assembly 17 for the incoming message side.

Furthermore, the output of the circuit X2 passes through a line $a$ and is applied to and activates a control relay 18 on the incoming message recording side, whereby relay contact points S$b$1 and S$b$2 are closed. Consequently, the output of the circuit X1 passes through the relay contact points S$b$1 and S$b$2 and is applied to and activates a sensor operating circuit X3. The output of this circuit X3 activates a release circuit X4, whereby a solenoid SOL2 of the incoming message recording side is activated. Furthermore, a DC motor 19 for driving at the same time a capstan provided in the vicinity of the incoming message recording and answering cassettes is started.

In addition, the output from the circuit X1 is applied by way of the relay contact points $Sb1$, $Sb2$, and $Sj1$ to a recording amplifying circuit X5 and a bias generating circuit X6. As a consequence, the cassette tape of the incoming message recording cassette 12 is clamped between and driven by a pinch roller and the capstan (both not shown). At the same time, the output signal of the circuit X2 is recorded as a stop signal for a specific time (approximately 10 seconds) on this tape by the incoming message recording head H3.

Upon completion of this recording of the stop signal, the ready button 20 is depressed, whereupon a relay contact point $Se1$ is closed, and the output of the circuit is supplied to and activates a signalling answering circuit X7. Consequently, an answering relay 21 is activated, and its relay contact point $Sa1$ is changed, whereby the relay is self held. Accordingly, an answering side solenoid SOL1 and the motor 19 are operated, and the endless tape within the answering cassette 11 is clamped and driven by the pinch roller and capstan. When, during the travel of the endless tape, a sensor (not shown) detects a sensing foil bonded at a specific position of the tape, the circuit X3 operates to generate pulse signals, which are supplied to the above mentioned answering circuit X7. As a consequence, the relay contact point $Se1$ is opened, and the relay 20 is rendered inoperative. Similarly, both the solenoid SOL1 and the motor 19 are rendered inoperative. Accordingly, the endless tape is stopped in a state wherein it has been made ready for new recording. In this state, a ready lamp 22 is lit to indicate that the apparatus 10 has assumed its ready mode.

The operation in the case when, in this mode of operation, a signal arrives will now be described. When a signal arrives at connection terminals L1 and L2 with the telephone line, this signal flows through a closed circuit of from the terminal L2 and through a relay contact point $Sd1$, an arriving signal receiving circuit X8, a capacitor, and the terminal L1, whereby the circuit X8 is activated. The circuit X7 operates intercoupledly with the operation of this circuit X8 to produce an output whereby the relay 21 is activated, and, at the same time, a signal arrival lamp 23 is lit. As a result of the activation of the relay 21, the relay contact point $Sa1$ is switched, and the relay 21 is self held in its operative state. Similarly, the solenoid SOL1 and the motor 19 are placed in their operative states, and, further, a reproduction amplification circuit X9 is rendered operative.

Consequently, the endless tape on the answering side which is in the ready mode starts to travel, and playing of the answering message is carried out by a recording-/reproducing head H1 incorporated within an answering head assembly 24. The resulting reproduced signal from the head H1 is supplied to and amplified by the amplification circuit X9, and the resulting output signal thereof passes through relay contact points $Sc1$ and $Sj2$ and passes further through a coupling transformer T1. Then, this signal passes through the relay contact point $Sd1$ switched and connected as described below and the terminal L2 and is sent to the telephone line as an answering message conveying information relating to the absence of the called person to the person making the call (hereinafter referred to as the telephone caller). Furthermore, the output of the circuit X7 is supplied to a control holding circuit X10, and relays 25 and 26 and an operation lamp 27 are all rendered operative. As a result particularly of the relay 26, the relay $Sd1$ is switched. Moreover, a lamp 27 is lit to indicate that the apparatus 10 is operating.

When the outgoing message containing information relating to the absence of the called person has been sent, and the endless tape within the cassette 11 has made one cycle of travel to bring the sensing foil to the position of the sensor, the sensor operating circuit X3 operates similarly as mentioned above, and the output signal therefrom is supplied to the circuits X7 and X10 and to a beep-tone generating circuit X11, whereupon these circuits are activated. The output signal of the circuit X11 is sent by way of the transformer T1 to the telephone line side and is sent as a beep tone to the telephone caller.

As another result of the operation of the circuit X7, the self holding state of the relay 21 is terminated, and the solenoid SOL1 is rendered inoperative. The travel of the endless tape is again stopped at the ready position for recording. Furthermore, as a result of the operation of the circuit X10, the relays 18 and 25 are held in their operative states, and the relay contact points $Sb1$, $Sb2$, $Sc1$, and $Sc2$ are changed over. As a result, the motor 19 continues to rotate, and the solenoid SOL2 newly operates. The cassette tape of the cassette 12 on the incoming message recording side starts to travel, and the apparatus 10 assumes the state for recording the incoming message.

Then, the audio signal of the incoming message sent from the telephone caller is transmitted through the telephone line and arrives at the terminal L2 and is thence transmitted by way of the relay contact point $Sd1$ and the transformer T1. This signal is further transmitted through the relay contact point $Sj2$ and relay contact points $Sc1$ and $Sc2$ in changed over state to the recording amplification circuit X5. The amplified voice signal from the circuit X5 is supplied by way of relay contact points $Sh1$ and $Sg1$ to the recording/reproducing head H3 of the head assembly 17. At the same time, a bias current from the bias generating circuit X6 is supplied to the head H3, and the content of the message spoken by the telephone caller is recorded on the still unrecorded cassette tape of the cassette 12.

Furthermore, the output of the circuit X5, is supplied to a voice activity control (VAC) circuit X13 producing as output a DC signal in accordance with the existence or nonexistence of an input signal. The output of the circuit X13 is applied to the control holding circuit X10, which is thereby held in its operative state, and the apparatus 10 is held in the mode for recording an incoming message. By controllably activating the monitor switching circuit X12 at this time, it is possible by means of a loudspeaker 28 to monitor the content of the incoming message from the caller, which message is being recorded at the moment.

When the telephone caller has completed his oral statement of his message and has replaced the telephone receiver on its cradle (i.e., has "hung up"), the circuit X5 stops sending an output signal to the VAC circuit X13, the output signal of which is reduced to zero after approximately 10 seconds. Consequently, the circuit X10 is rendered inoperative, and the operations of the relays 18, 25, and 26 are terminated. The motor 19 and the solenoid SOL2 are both rendered inoperative, whereby the apparatus is uncoupled from the telephone line and is restored to its original ready state. While the lamp 27 is extinguished at this time, lamps 22 and 23 continue to be lit to indicate that there has been an arriving signal at the apparatus 10.

Next, the operation of the apparatus 10 in the case of remote control thereof through the telephone line will be described. The apparatus 10 has three selectors (not shown) which are provided in specific positions and are adjustably set to selectively detect pair tones respectively composed of high tones and low tones generated when, at a remote calling point, the numeral buttons from zero to 9 of a so-called tough-tone telephone set are depressed in predetermined sequences.

When the owner of the apparatus 10 sends a call signal from a remote point to the telephone set connected to the apparatus 10, the apparatus 10 operates in the same manner as in the case described above. The endless tape on the answering side is driven through one cycle of travel, transmitting the answering message and the beep tones to the caller. Thereafter, the apparatus 10 assumes the ready state for recording.

When, with the apparatus 10 in this mode, the owner successively sends signals of three predetermined digits, these signals are transmitted through the telephone lines L1 and L2 to the apparatus 10. These three-digit signals are thereupon transmitted by way of the transformer T1 to the apparatus 10, by way of the transformer T1 to the apparatus 10, by way of a line $b$ to a limiter amplifying circuit X14 to be amplified, and are then supplied to an AC to DC conversion circuit X15. In this circuit X15, high tones and low tones are selected, and in accordance with the combinations thereof, numerals of from zero to 9 are read. The circuit X15 comprises a plurality of band-pass filters, amplification circuits, rectification circuits, DC amplification circuits, and other components.

The AC to DC conversion circuit X15 produces output signals, which are suitably combined in groups of three or four and supplied to a selector circuit X16 of the succeeding stage. From this circuit X16, signals of the first, second, and third digits are respectively supplied through line $c$, $d$, and $e$ to a first-digit control circuit X17, a second-digit control circuit X18, and a third-digit control circuit X19.

When the output signal of the circuit X16 appears in the line $c$, the circuit X17 is activated, and an output signal from the circuit X17 is continuously applied to the circuit X18 for approximately 5 seconds. When, during this period, an output signal from the circuit X16 appears in the line $d$, the circuit X18 is activated, and an output signal from the circuit X18 is continuously applied to the circuit X19 for approximately 5 seconds. When the output signal of the circuit X16 is supplied through the line $e$ to the circuit X19 during the output signal of the circuit X18 being supplied to the circuit X19, the circuit X19 is activated and the output signal of the circuit X19 is supplied to the call-back controlling power supply circuit X20. The circuit X20 operates after the signal from the circuit X19 stops arriving to supply a voltage to the above mentioned circuits X17, X18, and X19, which thereafter are placed in modes for operating independently in accordance with the arrival of their corresponding digit signals.

When the signals of the three digits successively arrive as mentioned above, the output signal of the circuit X19 activates a rewind control circuit X21, and the solenoid SOL2 on the incoming message recording side is rendered inoperative, whereby the pinch roller ceases to press against the capstan. At the same time, a solenoid SOL3 for driving the rewind mechanism is rendered operative. As a consequence, rewinding of the tape within the cassette 12 on the incoming message recording side is carried out. At the same time, a relay 29 for changing the apparatus 10 to the incoming message playing mode operates, and relay contact points $Sg1$, $Sg2$, $Sj1$, and $Sj2$ are respectively switched.

During this rewinding operation, furthermore, the head assembly 17 is lightly contacting the tape which is traveling at high speed. Accordingly, the signal reproduced by the head H3 is applied by way of the relay contact points $Sg1$ and $Sg2$ to the reproduction amplification circuit X9. The output of this circuit X9 is transmitted by way of the relay contact point $Sj2$ and the transformer T1 to the telephone line side, and an audio signal confirming the fact that rewinding is being carried out is sent to the caller at the remote point. The output of the circuit X9 is simultaneously applied to a rewind stopping circuit X22.

The rewinding is carried out to the part where the above mentioned stop signal is recorded. When the head H3 reproduces a stop signal, the circuit 22 is activated, and the rewind control circuit X21 is rendered inoperative. Consequently, the solenoid SOL3 is rendered inoperative, and the rewinding operation stops.

When the circuit X21 is rendered inoperative, the solenoid SOL2 for driving operates, and the cassette tape for message recording is clamped between and driven by the pinch roller and the capstan. Furthermore, a reproduction control circuit X23 is rendered operative by the above mentioned stop signal, and the apparatus is changed to a mode for playing back the recorded incoming message. As a result, the incoming message recorded on the cassette tape for recording incoming messages is transmitted to the owner of the apparatus 10 calling from the remote point.

The control actions and operations which can be carried out by the operator will now be simply described. When, during the above described rewinding operation, the signal of the second digit is sent, the circuit X21 is rendered inoperative, and the apparatus 10 is converted from the rewind mode to the reproducing or playback mode. Furthermore, when the owner sends a signal of the first digit for a short time during the playback operation, the circuit X17 operates and produces an output signal whereby a recording controlling circuit X24 operates, and the circuit X23 is rendered inoperative. As a result, the apparatus 10 is caused by the owner to assume a mode wherein it can record on the tape of the cassette 12 on the incoming message side.

When the owner continues to send the signal of the above mentioned first digit over a long period (2 seconds or more), the circuit X2 operates further, and a stop signal for the tape of the cassette 12 is recorded. For this reason, it is possible to prevent erroneous erasure of the principal incoming message content in next operation by listening to this content in the incoming message cassette 12 and thereafter sending the signal of the first digit over a long period of time thereby to record newly a stop signal. When, with the apparatus in the above mentioned recording mode, the owner, who is the caller, hangs up, the VAC circuit X13 is rendered inoperative after a specific period thereafter similarly as described above, and the circuit X10 is placed in its inoperative state, the apparatus 10 thereupon being placed in the ready mode.

When, with the apparatus in the mode for reproducing the recorded incoming message, the telephone caller sends the second-digit signal, a new message recording (NMR) control circuit X25 operates, whereupon a relay 30 operates, and relay contact points S$j$1, S$h$1, and S$h$2 are switched. As a consequence, the endless tape on the answering side is driven, and, moreover, the recording/reproducing head H1 and the erasing head H2 of the head assembly 24 on the answering side are both rendered operative, whereby a new message is recorded on the endless tape on the answering side. The apparatus 10 reproduces the message thus recorded anew and transmits it to the caller, then being placed in the ready state with the tape in a state of readiness for new recording.

Furthermore, when the signal of the second digit is received with the apparatus 10 in the mode for recording an incoming message, the circuits X18 and X23 operate, and the apparatus is placed in the mode for message playback. When, with the apparatus 10 in the above mentioned message recording state, the signal of the third digit is received, the apparatus is placed in the rewinding mode while this signal is being received and is placed in the message reproducing mode after this signal is no longer received.

Next, a device for preventing an operation uncapable of recording, which constitutes an essential part of the present invention will be described hereinafter. In FIGS. 2A and 2B, when, during the operation of the apparatus 10 to record the incoming message as described above in accordance with a signal sent from an ordinary caller, the tape of the cassette 12 on the message recording side is completely wound around the tape roll on the takeup side, and the tape of tape roll on the supply side is paid out to the tape end part, an end switch S2 is closed by the increasing tape tension. Consequently, a tape end control circuit X26 is activated by the DC voltage applied thereto from the power supply circuit X1. When the circuit X26 thus operates, the circuit X9 is immediately rendered inoperative, as described hereinafter, and is held in this state. Furthermore, while the switch S2 is closed, the beep tone generating circuit X11 is operated, and a beep tone indicating that the tape of the cassette 12 has arrived at its terminal end is transmitted to the caller by way of the telephone line.

Furthermore, after the elapse of a specific time (approximately 1 second) from the instant of closure of the switch S2, the circuit X4 which has been operative is rendered inoperative, and the solenoid SOL2 is rendered inoperative, whereby the tape of the cassette 12 on the message recording side stops traveling. Consequently, the tape tension decreases, and the switch S2 is again opened, but the circuit X26 is sustained in operative state. The circuit X9 is still held in its inoperative state. For this reason, in the case when the apparatus 10, in the above mentioned mode, receives a signal from a caller, the endless tape within the cassette 11 on the answering side is driven and travels in the same manner as described before, but playing of the answering message is not carried out, and sending of a message to the telephone caller is not carried out.

Accordingly, in the case where the cassette tape of the cassette 12 for incoming message recording is wound to its extreme end on the take-up reel, an answering message signal is not transmitted to the caller, and, as the endless tape of the cassette 11 travels through one cyclic circuit, only a beep tone is transmitted as described hereinbefore. Therefore, incidents of oral statement of the incoming message by the caller through error is prevented.

Specific embodiments of the circuits in FIGS. 2A and 2B will now be described with reference to FIGS. 3 and 4. The parts shown in FIGS. 3 and 4 which are of the same organization as those in FIGS. 2A and 2B are designated by the same reference numerals and characters, and detailed description of these parts will not be repeated.

The case where the apparatus has been placed in the above mentioned ready mode, and a still unrecorded portion is left in the tape of the cassette 12 on the message recording side will be considered. In this case, the switch S2 is opened although the DC voltage is applied to a line $i$ from the power supply circuit X1 as mentioned before. For this reason, transistors T$r$2 and T$r$3 of the circuit X26 are both in their nonconductive state, and a voltage is not being produced as output in a line $j$. Then, when a call signal from a caller arrives at the apparatus 10 at this time, the endless tape of the cassette 11 for answering message travels as mentioned before, and an answering message signal is reproduced and transmitted to the caller. During one cyclic circuit of this endless tape, the circuit X11 operates, and a beep tone is transmitted as a signal signifying completion of preparation for recording, whereupon the endless tape stops at this position.

Therefore, the DC voltage from the power supply circuit X1 is applied by way of a line $f$ to the circuit X4 and is further applied by way of a resistor R1 and a diode D2 to the base of an NPN transistor T$r$1. Consequently, this transistor T$r$1 becomes conductive, and the solenoid SOL2 parallelly connected with a damping diode between the collector of this transistor T$r$1 and the line $f$ is activated. The operation of the solenoid SOL2 causes the tape of the cassette 12 for incoming message recording to start traveling, and the oral message of the caller is recorded on this tape.

As the tape during this recording arrives near its end, the end switch S2 is activated and closed by the increased tape tension. Consequently, the voltage applied to the line $i$ is applied by way of a resistor R8 to the NPN transistor T$r$2, which thereby becomes conductive, whereby a current flows from the line $i$ through a resistor R5 and between the collector and emitter of the transistor T$r$2, and the collector voltage of the transistor T$r$2 decreases by a quantity equal to the voltage drop across the above mentioned resistor R5. This collector voltage of reduced potential is applied on the base of the PNP transistor T$r$3 by way of resistors R6 and R7. The transistor T$r$3 is thereby rendered conductive, its base potential being lowered. For this reason, the voltage of the line $i$ is applied by path differing from that mentioned above, that is, through the emitter and collector of the transistor T$r$2 in conductive state and a resistor R9, to the base of the transistor T$r$2. The transistor T$r$2 is self held in the conductive state even after the switch S2 has been opened as described hereinafter.

On one hand, when the switch S2 is closed, a capacitor C1 is charged by the voltage of the line $i$ through a resistor R4, and its terminal voltage rises gradually according to the time constant determined by the characteristics of the capacitor C1 and the resistor R4. When the charged voltage of the capacitor C1 reaches a predetermined value (approximately 1 second after the closure of the switch S2), a voltage is applied by way of a resistor R3 and a diode D4 to the gate of a thyristor SCR1, which is thereby turned on. As a consequence, the above mentioned base bias which has been applied on the transistor Tr1 from the line f through the resistor R1 and the diode D2 disappears, and the transistor Tr1 becomes nonconductive. Consequently, the solenoid SOL2 is rendered inoperative, and the tape of the cassette 12, which has reached its end portion, is released from the clamping and driving by the pinch roller and the capstan. The tape tension thereby decreases thereby causing the switch S2 to be opened again.

When the switch S2 is temporarily closed as mentioned above, the voltage applied to the line i is derived by way of the closed switch S2 and a diode D6 through a line l and is applied to the circuit X11 shown in FIG. 2, whereby a beep tone is sent to the telephone caller as a signal indicating that the apparatus is in a state of being incapable of recording.

Figure 3:
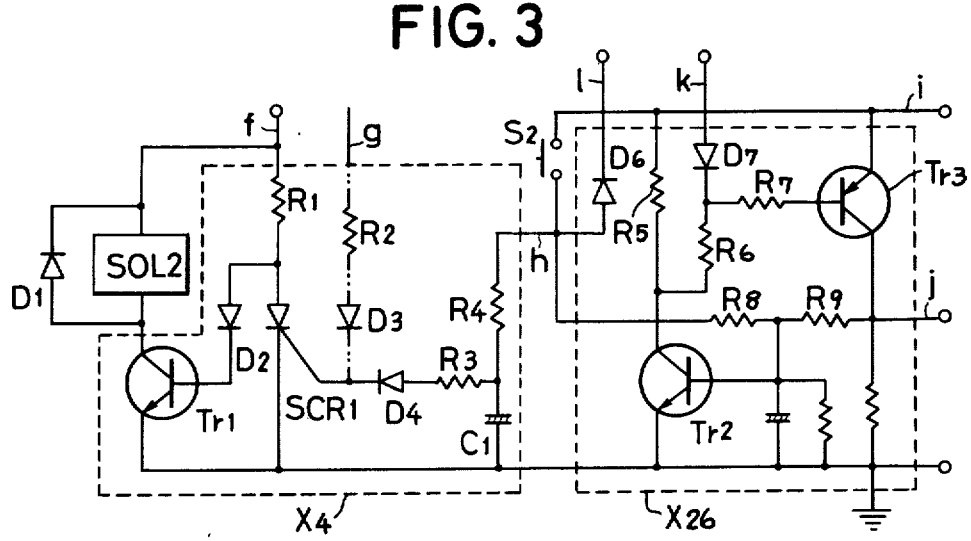
FIG. 3 is a circuit diagram of one part of an embodiment of a device for preventing erroneous recording which constitutes an essential and important part of the present invention.
Figure 4:
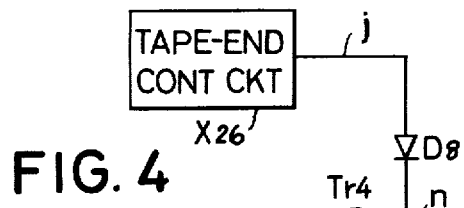
FIG. 4 is a circuit diagram of one embodiment of a circuit for controlling the operation of a reproduction amplification circuit constituting another part of the device constituting an essential part of the invention for operating cooperatively with the circuit shown in FIG. 3.

When, in the case where the cassette 12 on the incoming message recording side contains therewith an endless tape, a sensor detects a sensing foil secured to a specific position on the tape, a voltage appearing in a line g-is applied on the gate of the thyristor SCR1 by way of a resistor R2 and a diode D3 as indicated by intermittent line in FIG. 3. The thyristor SCR1 is thereby turned on, and the solenoid SOL2 becomes inoperative similarly as described above.

Then, even with switch S2 in opened state, the thyristor SCR1 of the circuit X4 and the transistors Tr2 and Tr3 of the circuit X2 are all held in the conductive state. This state is sustained relative to the thyristor SCR1 until the incoming message recording is completed or until a voltage appearing in the line f is removed for reasons such as the release of the recording and playback buttons 14 and 15, and this state is sustained relative to the transistors Tr2 and Tr3 until a voltage applied to the line i is removed by the release from the locked state of the ready button 20 or until the apparatus 10 is remotely controlled and a voltage is applied to a line k. When a voltage is applied to the line k as a result of the remote control as mentioned above, the transistor Tr3 receives a high voltage at its base by way of a diode D7 and the resistor R7 and thereby becomes nonconductive, and the self holding action due to the conductive state of the transistors Tr2 and Tr3 is terminated.

In the case where the transistors Tr2 and Tr3 of the circuit X26 are both conductive, a voltage applied to the line i is produced as an output voltage approaching the power supply voltage in the line j by way of the transistor Tr3.

Next, a first specific example of a device for operating cooperatively with the circuit shown in FIG. 3 will now be described in conjunction with FIG. 4. In the case where the apparatus 10 is in the aforementioned ready mode for recording, and an output is not appearing in the output line j of the circuit X26, a line m connected to the line j through a diode D8 is at the ground potential. This low potential is applied on the base of a PNP transistor Tr4 by way of a diode D9 connected in the forward direction, and the transistor Tr4 is placed in its conductive state. For this reason, a voltage applied to a line n from the power supply circuit X1 is supplied by way of the transistor Tr4 in conductive state to the reproduction amplification circuit X9, which thereby is rendered operative. Consequently, the apparatus 10 is operated by the telephone caller. First, as the endless tape on the answering side travels, the answering message signal recorded on this tape is reproduced by the recording/reproducing head H1, amplified by the circuit X9, then sent through the transformer T1 to the telephone line side, and thus transmitted to the caller.

Next, the operation of the apparatus 10 in the case where, with the apparatus in the state of having received a signal from the caller, the tape within the recording cassette 12 has already reached its end portion as mentioned above will be described. At this time, the thyristor SCR1 and the transistors Tr2 and Tr3 in FIG. 3 are all conductive, and a voltage is appearing in the output line j. This voltage is applied to ground by way of the diode D8 and a resistor R10 as shown in FIG. 4. At this time, furthermore, the sum voltage of the cathode voltage of the diode D9, the voltage drop in the forward direction of the diode D8, and the voltage drop in the forward direction between the base and emitter of the transistor Tr4 becomes greater than the voltage applied to the line n, and the transistor Tr4 is rendered nonconductive. Consequently, the reproduction amplification circuit X9 becomes inoperative since its voltage supply is cut off.

For this reason, when the apparatus receives a signal from the caller, the endless tape within the answering side cassette 11 is driven and travels, but the answering message signal is not reproduced by the head H1 and is not sent to the telephone line side. Consequently, the telephone caller does not hear any answering message and hears only a beep tone sent during one cyclic circuit of the endless tape, and an instructing the initiation of oral statement of the answering message to the caller is prevented. Since the thyristor SCR1 is conductive as stated above, the transistor Tr1 remains in its nonconductive state, and the solenoid SOL2 is similarly held in the inoperative state. Consequently, the tape within the recording side cassette 12 is not driven, and no inconvenience whatsoever occurs.

Figure 5:
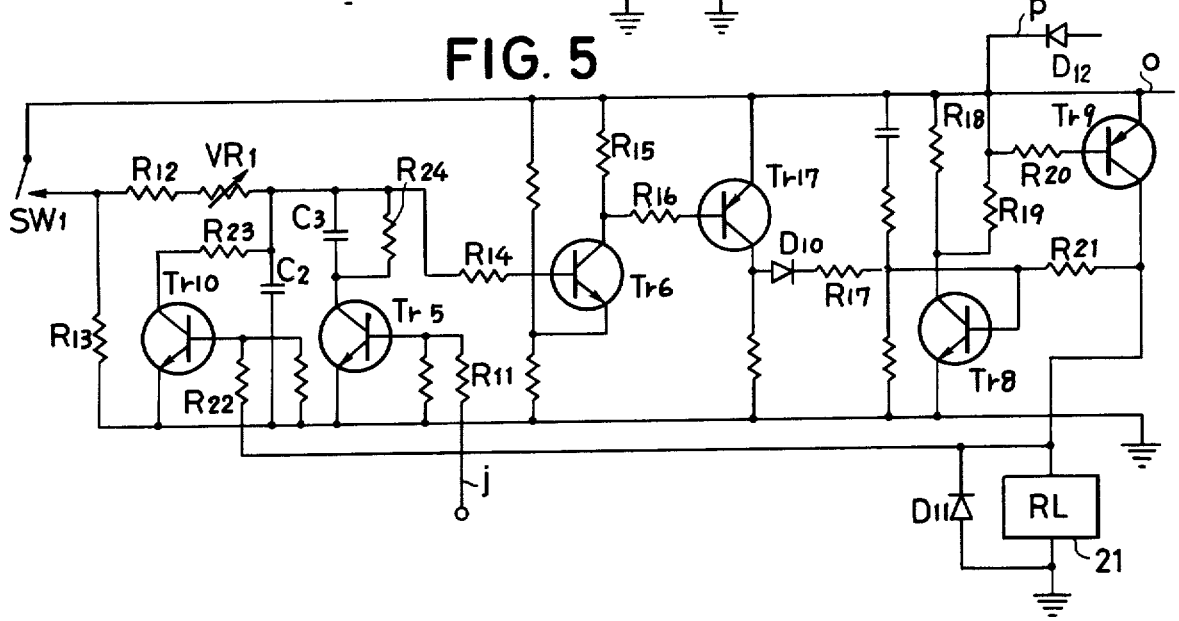
FIGS. 5 and 6 are circuit diagrams respectively showing embodiments of call answering circuits constituting another part of the device constituting an essential part of the invention for operating cooperatively with the circuit shown in FIG. 3.

A second embodiment of the device for operating cooperatively with the circuit shown in FIG. 3 will now be described with reference to FIG. 5. FIG. 5 shows a specific circuit organization of the call answering circuit X7 in FIG. 2 adapted to carry out different operations respectively for the case where a portion wherein recording is possible is remaining in the recording side cassette 12 of the apparatus 10 and the case where the tape has already arrived at its end.

First, the operation with respect to the former case will be described. At this time, the transistors Tr2 and Tr3 as shown in FIG. 3 are both nonconductive, and no output is present in the line j. Accordingly, a bias is not being imparted by way of the line j and a resistor R11 to the base of a transistor Tr5 shown in FIG. 5. When the apparatus 10 is set in the aforementioned ready mode, and a call signal is applied to the telephone line, a normally open switch SW1 carries out periodic opening and closing operation in accordance with the call signal. When the apparatus 10 couples with the telephone line during the periodic closed period of this switch SW1, a voltage applied to a line o from the power supply circuit X1 is applied by way of a resistor R12 and variable resistor VR1 to a capacitor C2.

During the opened period of the switch SW1, the charge in the capacitor C2 is discharged through the above mentioned variable resistor VR1 and resistors R12 and R13, but since the time constant of this discharge is longer than the time constant at the time of the above mentioned charging, the terminal voltage of the capacitor C2 rises during several cycles of the switching operation of the switch SW1, and the charging voltage of the capacitor reaches a specific value. This voltage is then applied through a resistor R14 on the base of an NPN transistor Tr6, which thereby becomes conductive. As a result, the collector potential of the transistor Tr6 decreases by a quantity equal to the voltage drop of a resistor R15, and this decreased voltage is applied by way of a resistor R16 on the base of a transistor Tr7, which thereupon becomes conductive.

Consequently, a bias voltage is applied, through a diode D10 connected in the forward direction to the collector of the transistor Tr7 and a resistor R17, to the base of a transistor Tr8, which thereupon becomes conductive. The collector potential of the transistor Tr8 thereupon decreases by a quantity equal to the voltage drop across a resistor R18. This low potential is applied through resistors R19 and R20 on the base of a PNP transistor Tr9, which thereupon becomes conductive. As a result, the relay 21 connected in parallel with a damping diode D11 for preventing reverse flow of coil current is supplied with current and operates, whereby the apparatus 10 carries out answering operation with respect to the caller.

When the above mentioned transistor Tr9 becomes conductive, a bias voltage is applied by way of a resistor R21 to the base of the transistor Tr8, which thereupon becomes conductive. The two transistors Tr8 and Tr9 are mutually self held in the conductive state. When the transistor Tr9 becomes conductive, the base of a transistor Tr10 is biased through a resistor R22, whereby the transistor Tr10 becomes conductive, and the charge in the capacitor C2 is discharged through a resistor R23 and the transistor Tr10.

When the endless tape of the answering side cassette 11 travels through on cyclic circuit, and the sensor circuit X3 is activated a mentioned before, a voltage is applied through a line p, a diode D12, and the resistor R20 on the base of the transistor Tr9, which thereby becomes nonconductive. As a consequence the above mentioned self-held state of the transistors Tr8 and Tr9 is terminated, and both of these transistors become nonconductive. The relay 21 similarly is rendered inoperative. At the same time, a voltage is applied to the line f as shown in FIG. 3, similarly as described before, and the transistor Tr1 is rendered conductive. Consequently, the solenoid SOL2 is activated, and the tape within the cassette 12 on the incoming message recording side begins to travel. Recording of the oral message from the caller is thus carried out.

The operation in the case where the tape within the message recording cassette 12 has arrived at its end, and there is no recordable remaining portion, will now be described. At this time, as described hereinbefore, the thyristor SCR1 and the transistors Tr2 and Tr3 in FIG. 3 are all in the conductive state, and an output voltage nearly equal to the power supply voltage appears in the line j. As a consequence, the base of the transistor Tr5 in the circuit shown in FIG. 5 is biased through the line j and the resistor R11, whereby the transistor Tr5 becomes conductive. A capacitor C3 and a resistor R24 thereby assume a state wherein they are connected in parallel with the capacitor C2. For this reason, when the switch SW1 carries out periodically its opening and closing operation in accordance with a call signal from a caller, the charging time constant of a charging circuit including capacitors C2 and C3 charged by a voltage applied to the line o and the resistor R24 is several times longer than the charging time constant of a charging circuit of only the capacitor C2.

Accordingly, the time required for the terminal voltages of the capacitors C2 and C3 to rise gradually, when the apparatus 10 receives a call signal from a caller, until the charging voltages thereof cause the transistor Tr6 to become conductive becomes several times that in the case of the aforedescribed mode, and it is possible to cause the caller to think that no one is at home at the called telephone.

Furthermore in accordance with the apparatus of the above described organization, the time required for the apparatus to be connected to the telephone line depending on its mode can be preset at will by appropriately selecting the time constant of the charging and discharging circuit.

Furthermore, when the aforedescribed remote control is carried out by the owner of the apparatus 10, the output applied to the line j as indicated in FIG. 5 disappears, and the transistor Tr5 becomes nonconductive. Consequently, the capacitor C3 is cut apart from the charging circuit of the capacitor C2, and the time from the start of calling to the answering of the apparatus 10 is again made the time determined by the charging time constant of the capacitor C2.

Figure 6:
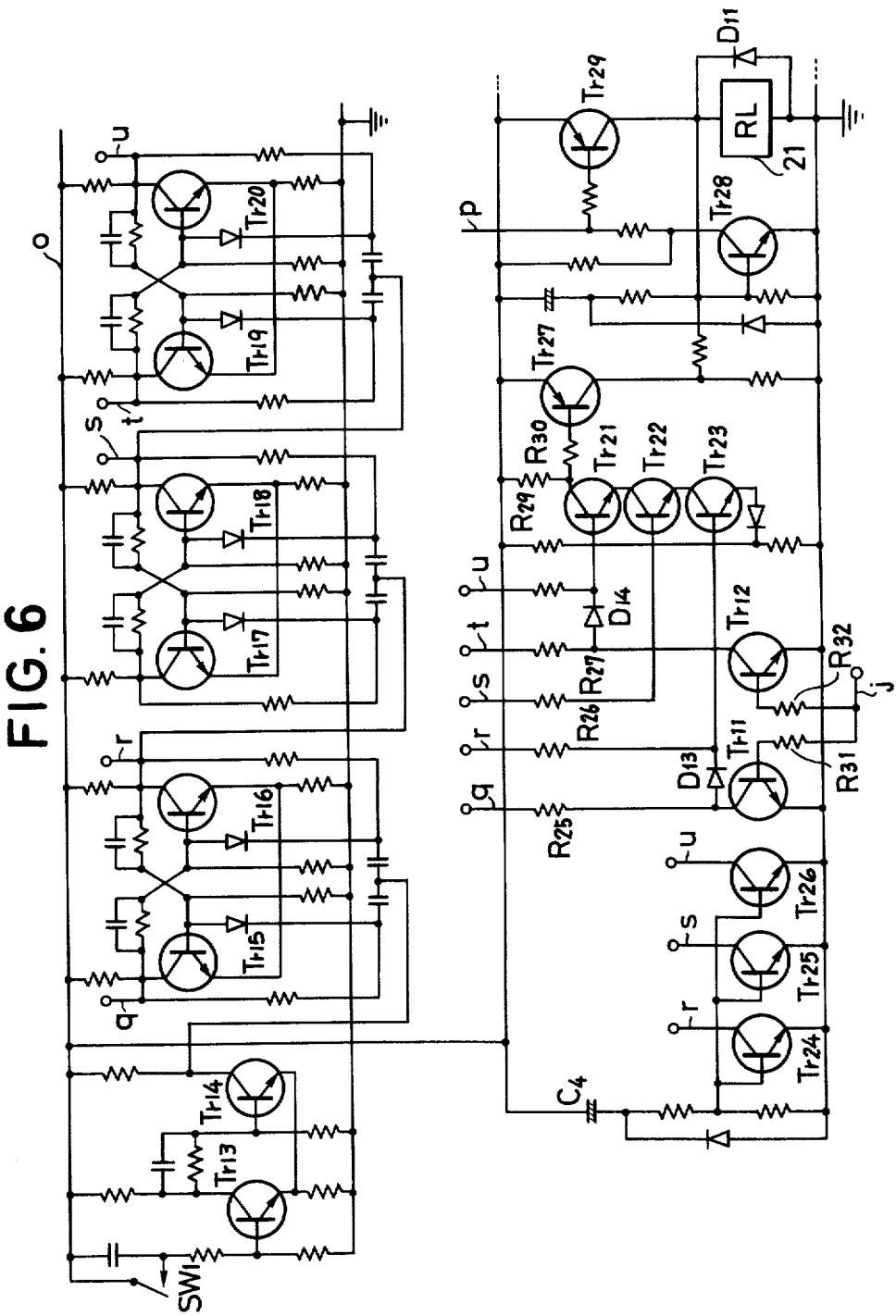

A third embodiment of a device for operating cooperatively with the circuit shown in FIG. 3 will now be described in conjunction with FIG. 6. FIG. 6 illustrates another embodiment of a specific circuit organization of the call answering circuit X7 shown in FIG. 1. Parts in FIG. 6 which are the same to those of the circuit shown in FIG. 5 are designated by like reference numerals, and repeated detailed description thereof will be omitted.

First, the operation in the case where a recordable portion is remaining in the tape within the cassette 12 on the incoming message recording side will be considered. At this time, transistors Tr2 and Tr3 shown in FIG. 3 are both in the nonconductive state, and there is no output in the line j. Accordingly, the bases of transistors Tr11 and Tr12 in FIG. 6 are not being biased, and these transistors are in their nonconductive state. Transistors Tr13 and Tr14 constitute a Schmidt circuit and output a pulse signal for each instance of opening and closing operation of the normally open switch SW1. Pairs of transistors Tr15 and Tr16, Tr17 and Tr18 and Tr19 and Tr20 respectively constitute flip-flop circuits and, in entirety, form a 3-digit counter. Furthermore, transistors Tr21, Tr22, and Tr23 constitute an AND circuit.

When the apparatus is coupled with the telephone line, the power supply voltage is applied to the line o, and the bases of the transistors Tr24, Tr25, and Tr26 are biased by a charging current supplied to a capacitor C4, whereby these transistors becomes conductive for a specific time. Consequently, lines r, s, and u of the transistor Tr16, Tr18, and Tr20 are grounded, and the transistors Tr15, Tr17, and Tr19 are rendered nonconductive, while the transistors Tr16, Tr18, and Tr20 are rendered conductive. Outputs of high potential appear in line q and t. Accordingly, while the bases of the transistors Tr21 and Tr23 of the AND circuit are biased, since the base of the transistor Tr22 is grounded, the gate of the AND circuit is closed.

When a call is received by the apparatus 10 to cause the switch SW1 to carry out its opening and closing operation for each arrival of the call signal, and pulses are produced as output from the Schmidt circuit, the modes of the transistors Tr15 through Tr20 vary in accordance with the number of these pulses as indicated in the following table.

| Number of pulses | TRANSISTOR | | | | | |
|---|---|---|---|---|---|---|
| | Tr15 | Tr16 | Tr17 | Tr18 | Tr19 | Tr20 |
| 0 | OFF | ON | OFF | ON | OFF | ON |
| 1 | ON | OFF | OFF | ON | OFF | ON |
| 2 | OFF | ON | ON | OFF | OFF | ON |
| 3 | ON | OFF | ON | OFF | OFF | ON |
| 4 | OFF | ON | OFF | ON | ON | OFF |
| 5 | ON | OFF | OFF | ON | ON | OFF |
| 6 | OFF | ON | ON | OFF | ON | OFF |
| 7 | ON | OFF | ON | OFF | ON | OFF |
| 8 | OFF | ON | OFF | ON | OFF | ON |

When the first call signal is sent and arrives from the telephone set on the caller's side, a first pulse signal is applied to a flip-flop circuit of the first digit, and the transistors Tr15 and Tr16 are respectively inverted to ON and OFF. Consequently, outputs of high potential appear in the lines r and t, and, similarly as described before, the base of the transistor Tr22 in the AND circuits remains with its gate closed.

When the second call signal is sent and arrives, and a second pulse signal is generated from the Schmidt circuit, the flip-flop circuits of the first and second digits operate, and the transistors Tr15, Tr18, and Tr19 become OFF, while the transistors Tr16, Tr17, and Tr20 become ON as indicated in the above table. Consequently outputs of high potential appear in the lines q, s and t and respectively bias the base of the transistor Tr23 through a resistor R25 and a diode D13 for preventing counter flow, the base of the transistor Tr22 through a resistor R26, and the base of the transistor Tr21 through a resistor R27 and a diode D14 for preventing counter flow. Therefore, the transistors Tr21, Tr22, and Tr23 are all turned ON, and the gate of the AND circuit constituted by these transistors is opened.

For this reason, the voltage drop of a load resistor R29 common to the transistors Tr21, Tr23, and Tr24 becomes large, and the collector potential of the transistor Tr21 decreases. This lowered potential is applied by way of a resistor R30 on the base of a PNP transistor Tr27, which thereby becomes conductive. Consequently, transistors Tr28 and Tr29 successively become conductive, similarly as in the operation of the transistors Tr2 and Tr3 in FIG. 3, and are self held in the conductive state. When the transistor Tr29 becomes conductive, the relay 21 operates, and the endless tape on the answering side of the apparatus 10 starts to travel, whereby the answering message is transmitted to the caller. When the endless tape has made on cyclic circuit to cause the sensor circuit X3 to operate, and an output appears in the line p, the transistors Tr28 and Tr29 are released from their self held state, and both become nonconductive.

As described above, in the case where the apparatus is in its normal state, it is automatically connected to the telephone line when a call signal is applied twice, that is, when the call bell of the telephone set on the answering side rings two times.

The operation in the case where the tape within the cassette 12 on the side for recording incoming messages has reached its extreme end will now be described. In this case, as mentioned before, an output of the power supply voltage appears in the line j in FIG. 3 and, passing through the line j in FIG. 6, is applied by way of resistors R31 and R32 to the bases of the transistors Tr11 and Tr12.

For this reason, while outputs of high potential appear in the line q, s, and t when a call signal is applied two times to the apparatus 10, the transistors Tr11 and Tr12 are rendered conductive, and the outputs of the lines g and t are by-passed. Accordingly, the bases of the transistors Tr25 and Tr21 are not biased, and the AND circuit is held with its gate in closed state. The answering relay 21 is rendered inoperative.

When the third call signal is sent to the apparatus 10, and a third pulse signal is produced as output from the Schmidt circuit, only the first digit flip-flop circuit operates, and the modes of the transistors Tr15 and Tr16 are inverted. As a total result, the transistors Tr15, Tr17, and Tr20 become conductive, while the transistors Tr16, Tr18, and Tr19 become nonconductive. Consequently, outputs of high potential appear in the lines r, s, and t and are respectively applied to the bases of the transistors Tr23, Tr22, and Tr21. However, the high potential applied to the line t is by-passed by the transistor Tr12, and the base of the transistor Tr21 is not biased, whereby this transistor Tr21 is in the nonconductive state. For this reason, the AND circuit is placed in a state with its gate closed, and the answering relay 21 does not operate. Thus, the apparatus 10 is held in the state wherein its connection with the telephone line is broken.

Similarly, even when the fourth, fifth, and sixth call signals are received, the AND circuit of the call answering circuit X7 within the apparatus is maintained with its gate still closed. When the seventh call signal arrives at the apparatus 10, the transistors Tr15, Tr17, and Tr19 in the flip-flop circuits of the first, second, and third digits become conductive, while the transistors Tr16, Tr18, and Tr20 become nonconductive. As a consequence, outputs of high potential appear in the lines r, s, and u, and outputs of low potential appear in the lines q and t.

Then the high potential of the terminal s is applied on the base of the transistor Tr22, and the high potentials of the terminals r and u are respectively applied on the bases of the transistors Tr23 and Tr21 without being by-passed by diodes D13 and D14. Consequently, the transistors Tr21, Tr22, and Tr23 are simultaneously rendered conductive, and the gate of the AND circuit is opened. Accordingly, similarly as before, the transistors Tr27, Tr28, and Tr29 are rendered conductive. As a result, the answering relay 21 operates, and the endless tape on the answering side of the apparatus 10 begins traveling, whereby the answering message is transmitted to the caller.

As mentioned before, in the case where the apparatus 10 is placed in the state wherein an incoming message from a caller cannot be recorded, the time required for the apparatus, after the start of calling, to answer and be connected to the telephone line becomes long. In this embodiment, the bell of the answering telephone set rings seven times, and then for the first the apparatus 10 is connected to the telephone line. Accordingly, it is possible to cause the caller to conclude that the called person is not at home.

Furthermore, by combining the above described second and third embodiments with the first embodiment, it is possible, even when the caller continues calling, and the apparatus is connected to the telephone line, to prevent transmission of an answering message to the caller.

When an operation signal due to remote control is applied to the line $k$ as shown in FIG. 3, the output of the line $j$ is reset, and the call answering circuit X7 is again rendered into an answering starting mode by two calls.

Furthermore, the number of call signals required for the apparatus to be connected to the telephone line in accordance with its mode of operation can be set at the same number irrespective of the kind of call signal. Moreover, by changing the number of digits of the flip-flop circuits and, further, changing the organization of the AND circuit, the number of call signals for the apparatus be connected to the telephone line can be set at will.

Further, this invention is not limited to these embodiments but various variations and modifications may be made without departing from the scope and spirit of the invention.

What I claim is:

1. An automatic telephone answering and recording apparatus comprising:
   a first cassette tape recorded previously with an answering message;
   answering means connected to a telephone line and operable automatically in response to a call arriving over the telephone line from a caller when the called person is absent for actuating reproducing means for play back of the answering message of the first cassette tape and for actuating connecting means for connecting to the line a transmitting means for sending said message through the telephone line toward the caller;
   a second cassette tape having a still unrecorded portion;
   caller's message recording means which is adapted to operate after the completion of the operation of said answering means for recording on the second cassette tape a message arriving from the caller through the telephone line;
   detecting means connected to said caller's message recording means for detecting the fact that the second cassette tape has been paid out to its extreme end and accordingly maintaining an output detection signal so long as said tape is paid out;
   answering message inhibit means connected to said detecting means and to said transmitting means, for preventing the transmitting means from sending the answering message to the caller after the connecting means is operated when the output detecting signal is maintained by said detecting means; and
   delay means operably connected to said connecting means and to said detecting means, for operating only when the output detection signal from said detecting means is being maintained, and adapted when a call arrives, to increase the period of time required for actuation of said connecting means over the time normally required, said answering message inhibit means preventing said answering message from being transmitted after said connecting means is actuated with delay through said delay means.

2. An automatic telephone answering and recording apparatus as set forth in claim 1 which further comprises remote control means connected to the telephone line and operable by remote control by the owner of the apparatus, through the telephone line, to rewind said second cassette tape so as to disconnect the output signal of the detecting means and thereby to render said delay means inoperative.

3. An automatic telephone answering and recording apparatus as set forth in claim 1 in which said delay means has a charging and discharging circuit operating in accordance with the existence or nonexistence of the output of the detecting means to form circuit organizations of different charging time constants and to control the answering time from the instant of reception of a call signal to the start of activation of the apparatus so as to make the time period for actuating said connecting means longer when there is the output detecting signal than when said signal is not present.

4. An automatic telephone answering and recording apparatus as set forth in claim 1 in which said delay means comprises flip-flop circuits for a number of digits respectively connected in series and operating in response to reception of call signals to produce outputs, an AND circuit having an input connected to the output of each said flip-flop circuit and having an output connected to said connecting means so that when a first predetermined number of calling signals are received, said AND circuit activates said connecting means, and bypass means connected to said flip-flop circuits for bypassing specific output signals out of said outputs of said flip-flop circuits when said detecting means maintains said output detection signal, wherein, when said bypass means is operated, said AND circuit activates said connecting means in response to the arrival of a second predetermined number of calling signals larger than the first predetermined number.

* * * * *